(12) United States Patent
Lungu et al.

(10) Patent No.: US 7,676,949 B1
(45) Date of Patent: Mar. 16, 2010

(54) TAPE MEASURE WITH ROTATING TAPE CATCH

(76) Inventors: Emanuel Lungu, 3541 High Ridge Rd., Boynton Beach, FL (US) 33426; Pavel Lungu, 3541 High Ridge Rd., Boynton Beach, FL (US) 33426

( * ) Notice: Subject to any disclaimer, the term of this patent is extended or adjusted under 35 U.S.C. 154(b) by 0 days.

(21) Appl. No.: 12/018,374

(22) Filed: Jan. 23, 2008

(51) Int. Cl.
*G01B 3/10* (2006.01)
(52) U.S. Cl. .......................... 33/770; 33/758
(58) Field of Classification Search ............... 33/755, 33/757, 758, 759, 760, 770
See application file for complete search history.

(56) References Cited

U.S. PATENT DOCUMENTS

| | | | |
|---|---|---|---|
| 5,600,894 | A | 2/1997 | Blackman et al. |
| 6,115,931 | A * | 9/2000 | Arcand ................ 33/770 |
| 6,796,052 | B1 * | 9/2004 | Lin ..................... 33/758 |
| 6,826,845 | B2 | 12/2004 | Pritchard |
| 7,055,260 | B1 * | 6/2006 | Hoffman ............... 33/758 |
| 7,181,860 | B1 | 2/2007 | Umholtz |
| 7,185,446 | B1 | 3/2007 | King |
| 2002/0011008 | A1 * | 1/2002 | Nelson et al. ............ 33/770 |
| 2002/0073570 | A1 * | 6/2002 | Conder ................. 33/758 |
| 2002/0184783 | A1 * | 12/2002 | Poineau et al. .......... 33/758 |
| 2004/0168335 | A1 | 9/2004 | Pritchard |
| 2006/0053649 | A1 | 3/2006 | Greally |
| 2006/0107546 | A1 | 5/2006 | Pritchard |
| 2006/0254071 | A1 * | 11/2006 | Kilpatrick et al. ......... 33/758 |
| 2007/0124950 | A1 | 6/2007 | Wirtz |

* cited by examiner

*Primary Examiner*—G. Bradley Bennett
(74) *Attorney, Agent, or Firm*—Gold & Rizvi, P.A.; Glenn E. Gold; H. John Rizvi

(57) ABSTRACT

A measuring tape (150) having a pivoting catch (160) that rotates (172) about a measuring tape axis (159). A rotational catch coupling assembly is secured to the distal end of the measuring tape. The catch (160) is pivotally assembled to the rotational catch coupling assembly via a pivot assembly having a pivot shaft (180) and a lock assisting spring (188). The pivot shaft (180) is oriented parallel to the measuring tape axis (159). A registration interface such as pins (174) and apertures (176, 177, 178) maintain the catch (160) in position. The catch (160) rotates 360 degrees, and can include registration at any angle, but preferably at least 0, 90, 180, and 270 degrees.

18 Claims, 14 Drawing Sheets

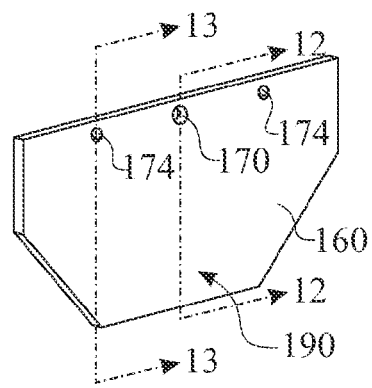
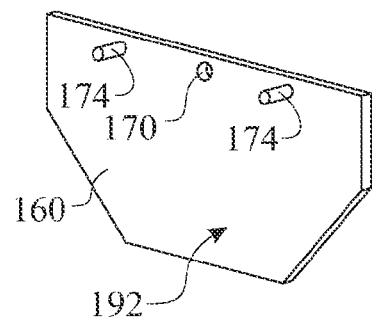
*FIG. 10*         *FIG. 11*
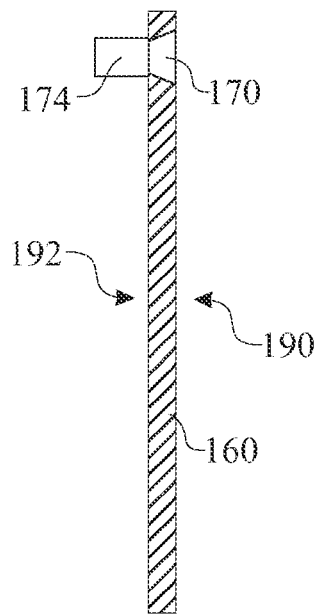
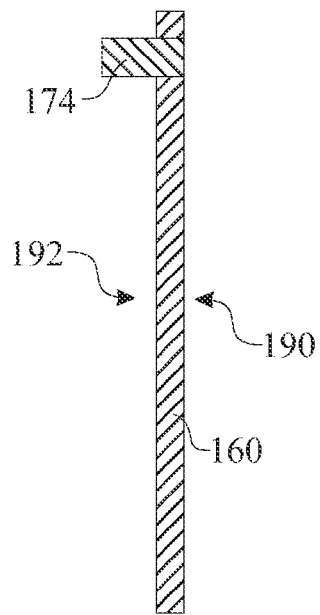
*FIG. 12*         *FIG. 13*

TAPE MEASURE WITH ROTATING TAPE CATCH

BACKGROUND OF THE INVENTION

1. Field of the Invention

The present invention relates to a tape measuring device having an improved catch for engaging an edge below or above the tape or pressing against an object from which a measurement is to be taken.

2. Discussion of the Related Art

Tape measuring devices include a housing, a retracting measuring tape having a catch disposed at the free end of the tape, and a retracting mechanism. The catch is commonly provided at a right angle to the measuring tape.

Retracting tape measures are generally used to measure an object and to mark and measure distances. The measuring tape extends from a front wall of the housing. Standard tape measuring devices include a catch, or hook, on the front of the tape to assist the user when marking and measuring distances and objects. However, the conventional fixed orientation of the catch, typically outward perpendicular to the tape, limits the functionality. There is a need for a tape measure having a catch that can be adjusted into a plurality of orientations with respect to the tape. It would also be desirable to provide such a catch which would ensure that the measuring tape, when used to measure a distance along a planar wall, lays substantially parallel with the wall.

Several innovative tape measuring devices are known that incorporate a catch that can be pivoted about an axis perpendicular to the measuring tape axis or centerline. One such design provides an "L"-shaped catch. The L-shaped catch rotates about an axis perpendicular to the measuring tape centerline, orienting downward when rotated counterclockwise and upward when rotated clockwise.

In another instance, the catch is hinged and incorporates a spring. When the tape is extended, the tongue can pivot about the axis when it encounters an object in its path. This type of known catch design is very limited in that it fails to provide a catch for measuring structures other than those including a wall edge.

There is an unmet need for a tape measuring apparatus having an end catch that can accommodate both an anterior surface and a posterior surface while the measuring tape remains parallel to the object's surface.

SUMMARY OF THE INVENTION

Various features and advantages of the invention will be set forth in part in the following description, or may be obvious from the description, or may be learned from practice of the invention.

One aspect of the present invention provides for a tape measure comprising a catch disposed at a free end of a measuring tape, the catch being pivotally coupled to the tape end to enable rotation about a longitudinal axis of the tape.

Another aspect of the present invention rotates the catch about a pivot shaft located through a catch coupling member.

Another aspect provides a lock assisting spring, wherein the spring retracts the catch against the catch coupling member.

Another aspect of the present invention provides a registration interface for registering the orientation of the catch.

Another aspect of the present invention provides at least one pin and respective aperture for registering the orientation of the catch.

Yet another aspect provides apertures within the catch, wherein the pins are incorporated at locations that position the catch at 0 degrees and 180 degrees.

Yet another aspect provides apertures within the catch, wherein the apertures are incorporated at locations that position the catch at 0, 90, and 180 degrees.

Another aspect of the present invention provides at least one tab and at least one slot for registering the orientation of the catch.

Yet another aspect provides apertures within the catch, wherein the tab and slots are incorporated at locations that position the catch at 0 and 180 degrees.

Yet another aspect provides apertures within the catch, wherein the tab and slots are incorporated at locations that position the catch at 0, 90, and 180 degrees.

Yet another aspect incorporates a plurality of apertures within the measuring tape for aiding in marking a distance.

Yet another aspect positions the apertures at even intervals. The intervals can be English standard, Metric standard or any other measurement. The apertures can be of different sizes and shapes to distinguish between dimensions.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs., in which:

FIG. 10 is an isometric anterior view of the catch provided in the rotating catch tape measure previously presented in FIG. 8;

FIG. 11 is an isometric posterior view of the catch previously presented in FIG. 10;

FIG. 12 is a sectional view of the catch defined as section 12-12 of FIG. 10;

FIG. 13 is a sectional view of the catch defined as section 13-13 of FIG. 10;

Figure 1:
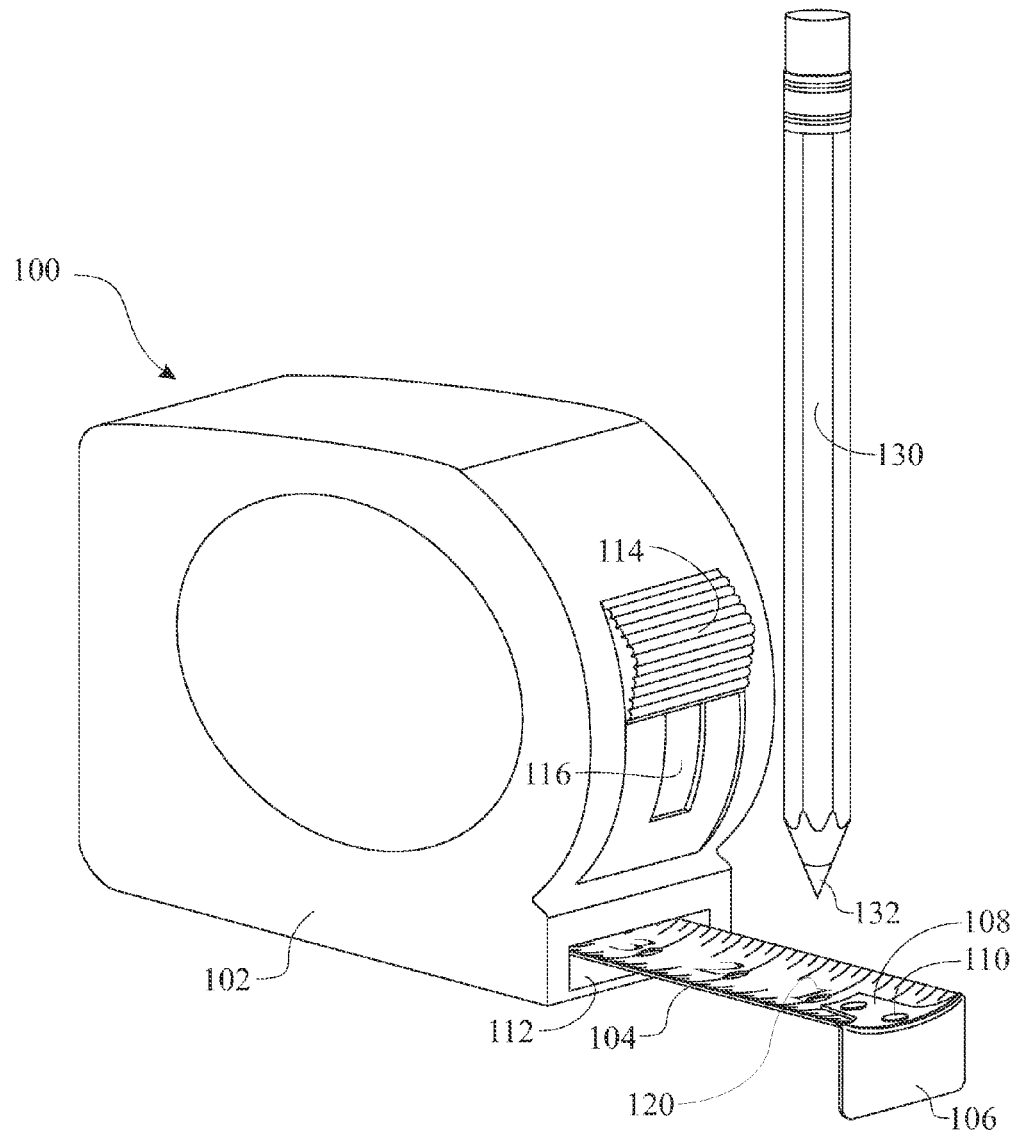
FIG. 1 is an isometric view of a perforated tape measuring and marking device in accordance with an exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides a perforated tape measuring and marking device 100, best presented in the exemplary embodiment of FIG. 1. The perforated tape measuring and marking device 100 includes a tape housing 102 for containing a measuring tape 104. The measuring tape 104 is extended from and retracted into a tape port 112 via a retracting mechanism, such as a coil spring, manual winding mechanism, and the like. The tape can be maintained in an extended state by sliding a tape lock 114, which applies a locking force to the measuring tape 104. The tape lock 114 slides within a tape lock slot 116. A tape catch 106 is assembled to a distal end of the measuring tape 104 via a tape catch mount 108 and a plurality of catch fasteners 110. Preferably, the measuring tape 104 further includes a plurality of uniformly positioned tape apertures 120. The tape apertures 120 can be positioned at any of a variety of English standard intervals, including 1", ½, ¼", and the like, as well as Metric standard intervals including 5 mm, 1 cm, 5 cm, and the like. The tape apertures 120 can be of similar or different dimensions and shapes for aiding in identifying the respective measurement. The tape apertures 120 are provided for any of a variety of marking methods. An exemplary embodiment utilizing a writing utensil such as a pencil 130 having a writing portion such as a sharpened lead point 132.

A rotating catch tape measure 150 is best presented in the exemplary embodiment of FIGS. 2 through 24. The rotating catch tape measure 150 includes a tape measure housing 152 for containing a measuring tape 154. The measuring tape 154 is extended from and retracted into a tape port 156 via a retracting mechanism such as a coil spring, manual winding mechanism, and the like. A rotating catch 160 is assembled to a distal end of the measuring tape 154 utilizing a rotational catch coupling assembly, such as the exemplary embodiment presented herein, including a lower coupling member 162, a upper coupling member 164 and a pivot shaft 180. The tape port 156 is preferably sized to accept the rotational catch coupling assembly.

Exploded views of rotational catch coupling assemblies are best shown in FIGS. 3, 10, 15, and 20. The measuring tape 154 is sandwiched, or interposed, between the lower coupling member 162 and the upper coupling member 164. The lower coupling member 162 and upper coupling member 164 are coupled using a plurality of coupling fasteners 166. In the exemplary embodiments, two or four coupling fasteners 166, such as flathead (countersunk) threaded fasteners, are inserted through fastener ports 168 of the upper coupling member 164, and secured into fastener receiving threads 169 of the lower coupling member 162. The fastener ports 168 provide a receiving countersunk port resulting in a planer upper surface of the upper coupling member 164.

The rotating catch 160 is pivotally secured to the rotational catch coupling assembly via a pivot assembly. An exemplary embodiment of the pivot assembly is presented in FIGS. 3, 10, 15, and 20. The illustrated pivot assembly includes a pivot shaft 180 having shaft threading 186 exposed at each end for receiving a distal pivot fastener 182 and a proxil pivot fastener 184. The pivot shaft 180 is slidable and extends through a shaft port 181 of the upper coupling member 164, the shaft captured by the shaft port 181 using two end fasteners 182, 184. The rotating catch 160 is secured to the assembly by inserting the distal pivot fastener 182 through a catch pivot aperture 170 of the rotating catch 160. The distal pivot fastener 182 is preferably a flat head threaded fastener, and the catch pivot aperture 170 is preferably countersunk to provide a smooth catch exterior face 190. A registration assist spring 188 is disposed about the proxil end (proxil pivot fastener 184 side) of the pivot shaft 180. The registration assist spring 188 provides a retention force, maintaining the rotating catch 160 against the distal edge of the coupling members 162, 164.

The rotating catch 160 is oriented via a registration interface. One set of exemplary embodiments presented utilizes a plurality of pins and respective apertures. The pins can be arranged in a variety of configurations, such as:

a. wherein the alignment of the pins 174 is linearly offset from the shaft port 181, as presented in FIGS. 2 through 7; and
 b. wherein the alignment of the pins 174 is aligned with the shaft port 181, as presented in FIGS. 8 through 13.

Figure 2:
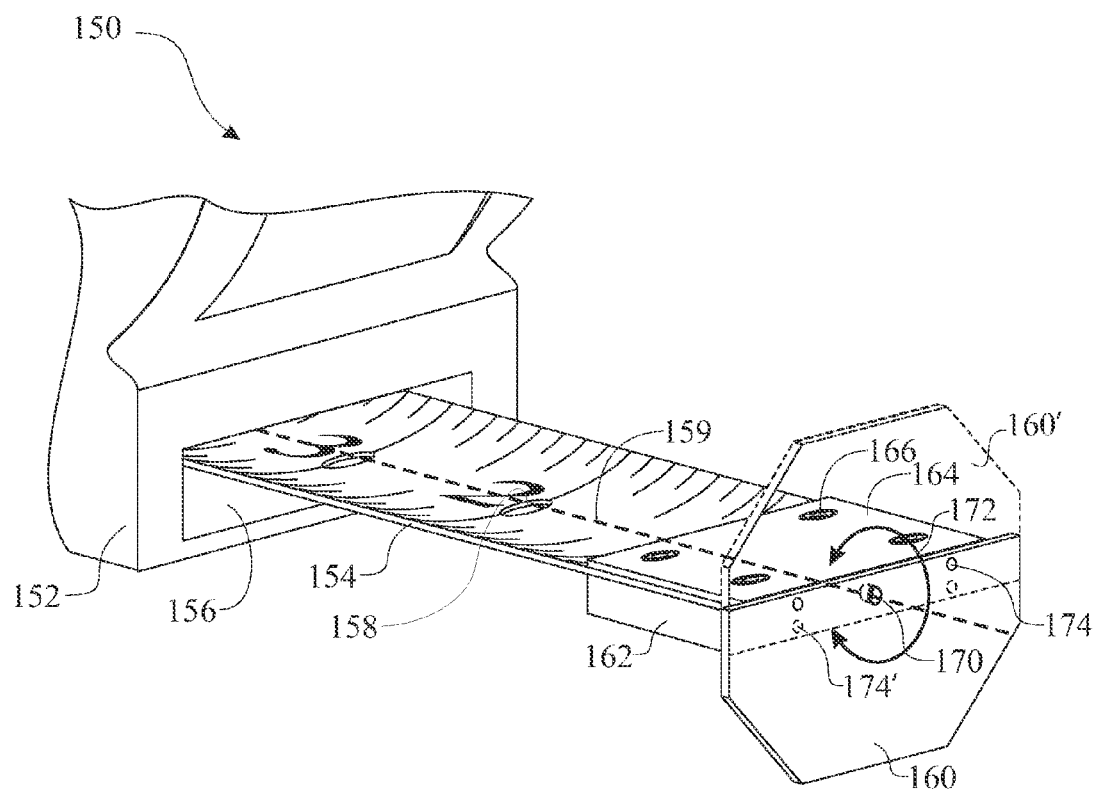
FIG. 2 is an enlarged isometric view of a rotating catch tape measure in accordance with another exemplary embodiment of the present invention.
Figure 3:
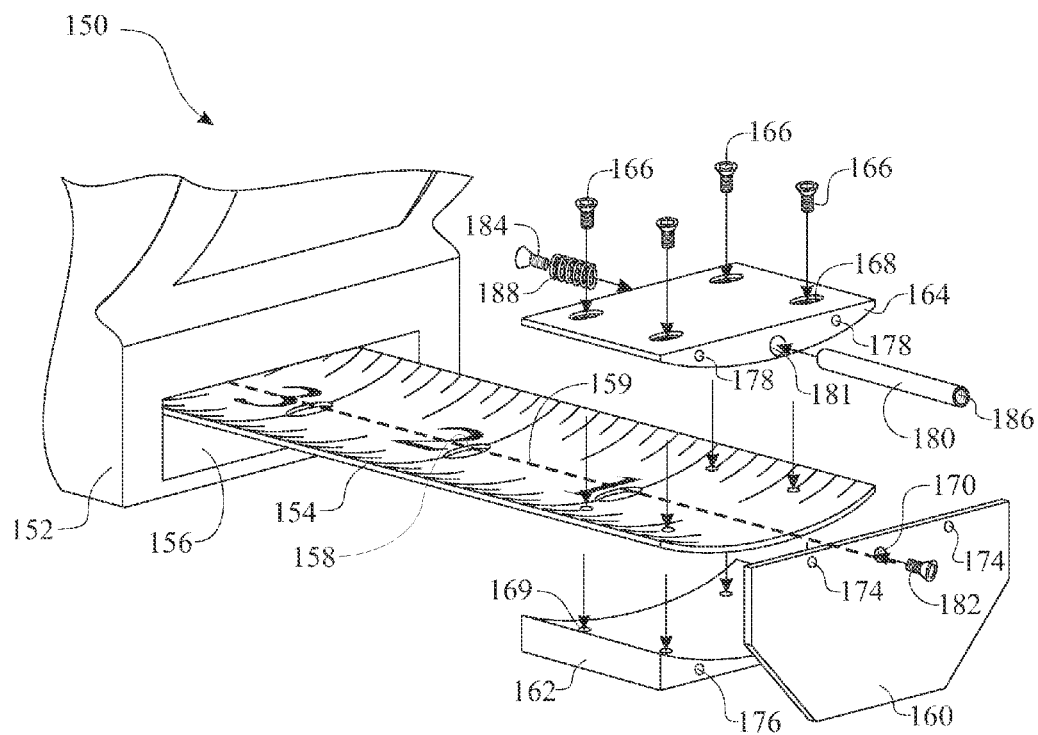
FIG. 3 is an isometric assembly diagram of the rotating catch tape measure previously presented in FIG. 2.
Figure 4:
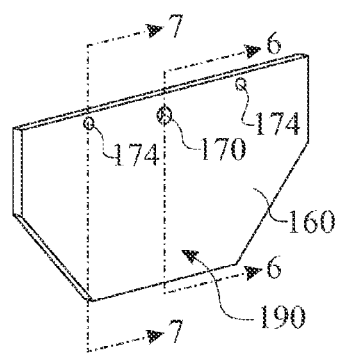
FIG. 4 is an isometric anterior view of the catch provided in the rotating catch tape measure previously presented in FIG. 2.
Figure 5:
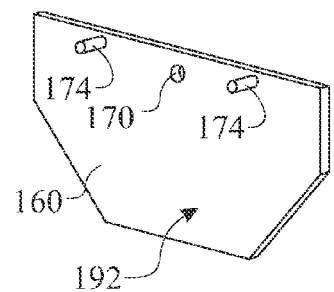
FIG. 5 is an isometric posterior view of the catch previously presented in FIG. 4.
Figure 6:
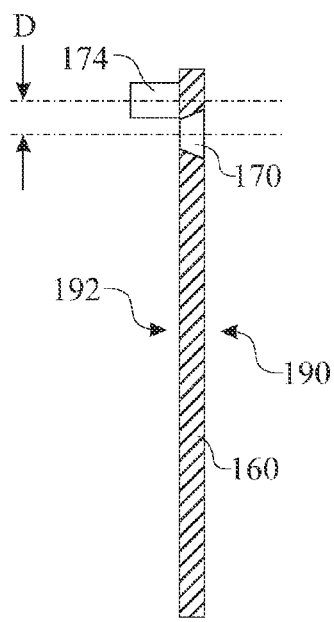
FIG. 6 is a sectional view of the catch defined as section 6-6 of FIG. 4.
Figure 7:
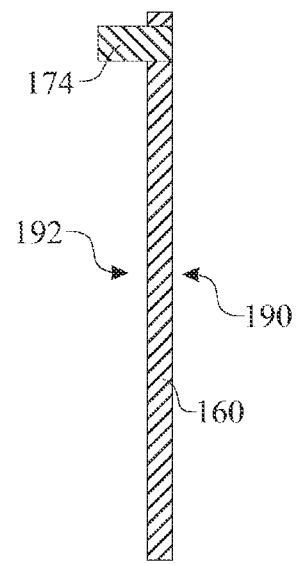
FIG. 7 is a sectional view of the catch defined as section 7-7 of FIG. 4.
Figure 8:
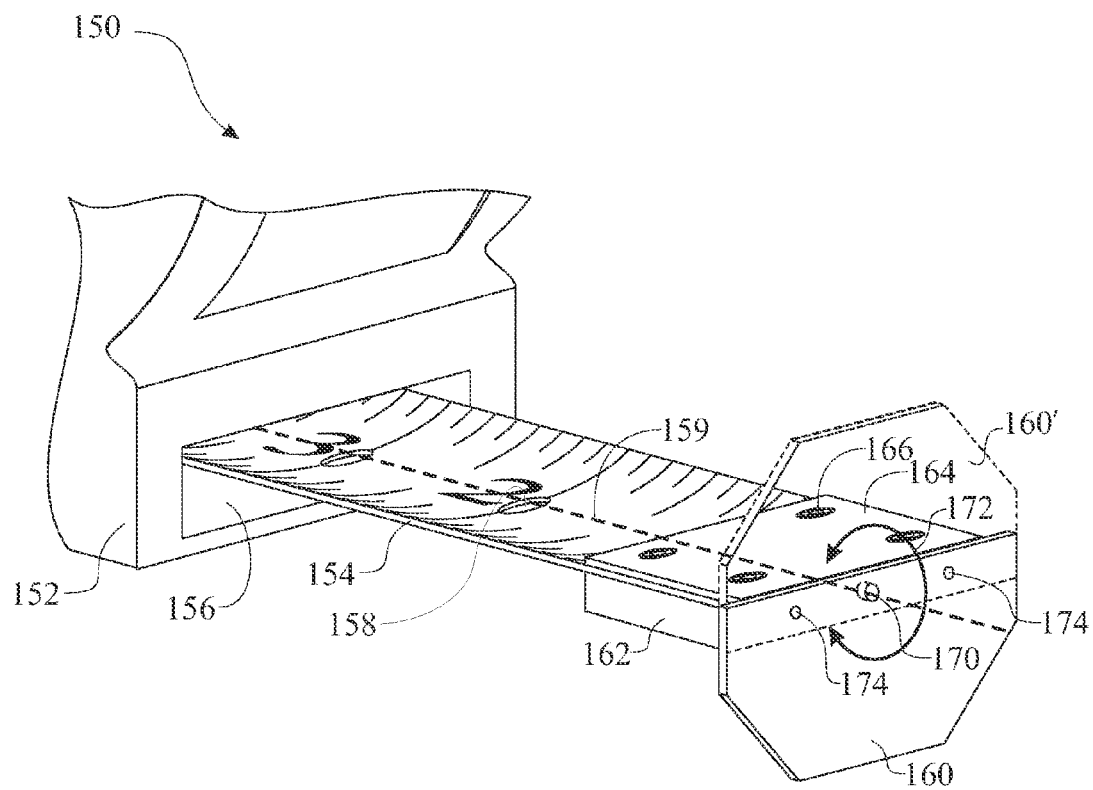
FIG. 8 is an enlarged isometric view of a rotating catch tape measure in accordance with another exemplary embodiment of the present invention, presenting an alternate configuration of the locking pins.

In the first pin configuration, the pins 174 are offset by a dimension D from the catch pivot 170. The pins can be assembled to the rotating catch 160 by drilling holes through the rotating catch 160, then press fitting the rotation locking pins 174 through the holes, seating the pins 174 to be flush with the catch anterior contacting surface 190 and projecting from the catch posterior contacting surface 192. When the user rotates the catch 160 to project upwards via a catch rotation 172, the pins 174 are dislodged from the upper locking apertures 178 and subsequently inserted into the lower locking apertures 176, as presented as rotation locking pins 174' illustrated in phantom (FIG. 2).

Figure 9:
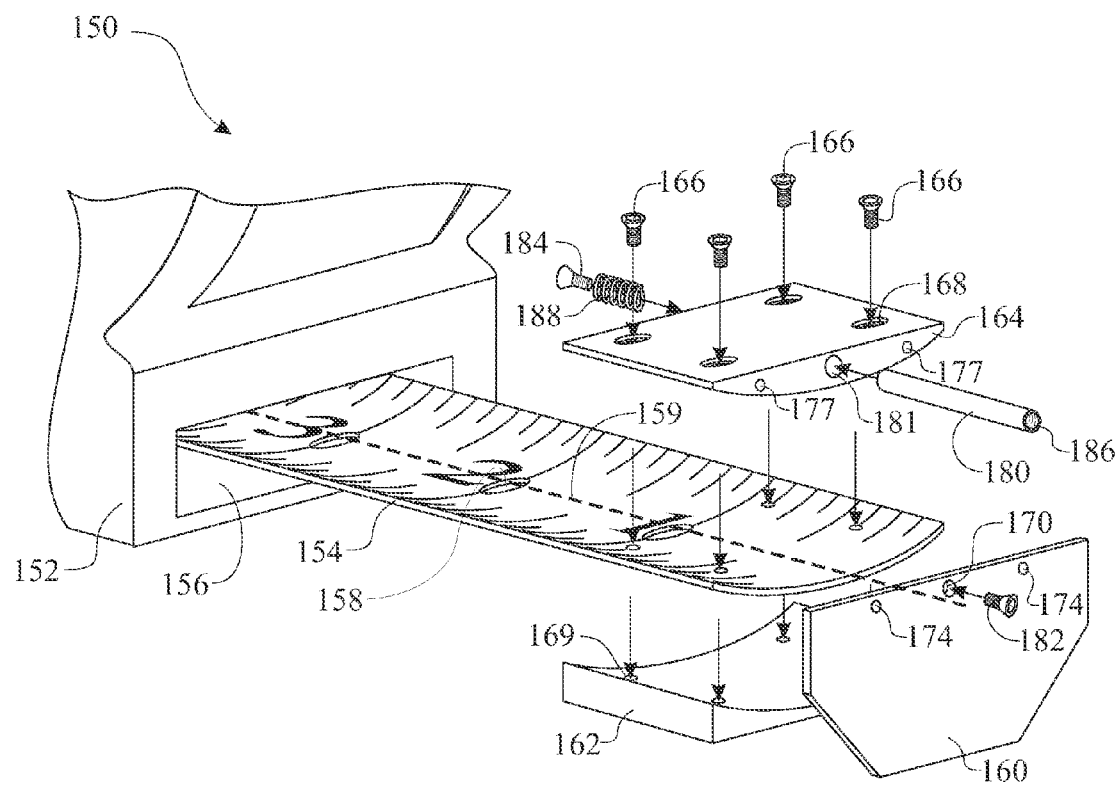
FIG. 9 is an isometric assembly diagram of the rotating catch tape measure previously presented in FIG. 8.
Figure 14:
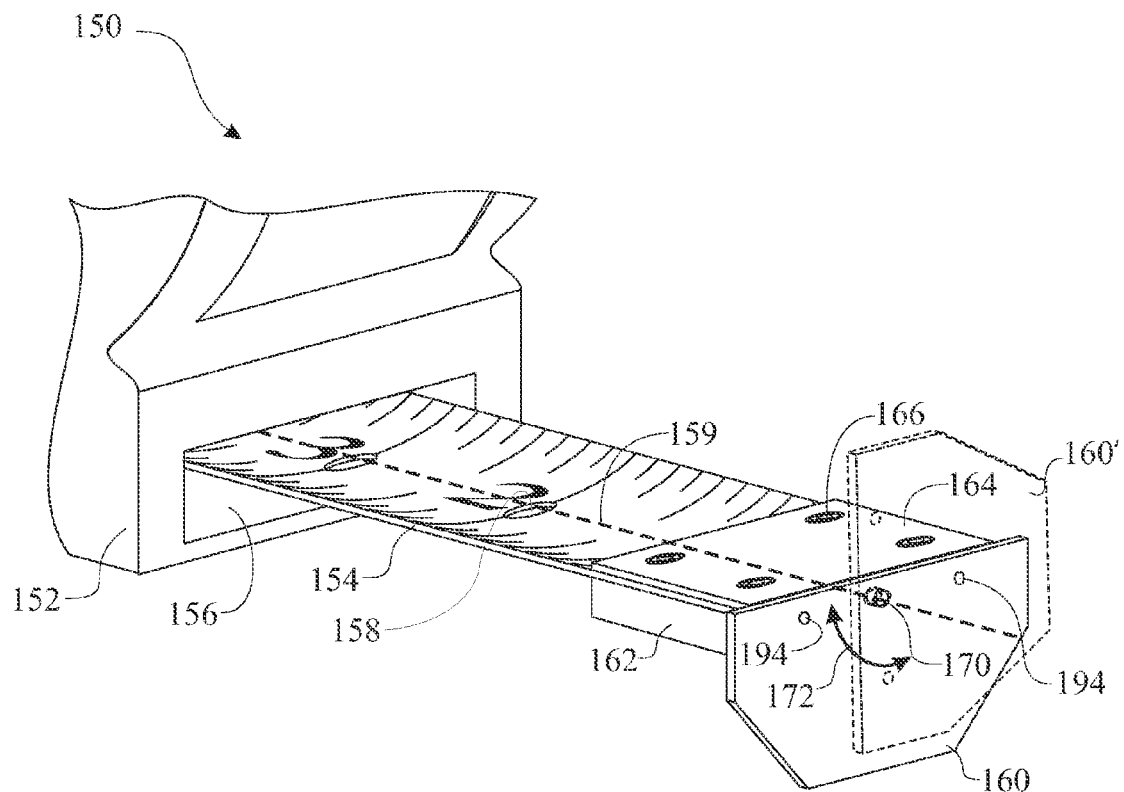
FIG. 14 is an enlarged isometric view of a rotating catch tape measure in accordance with yet another exemplary embodiment of the present invention, presenting another alternate configuration of the locking pins, allowing the catch to rotate in 90 degree increments.
Figure 15:
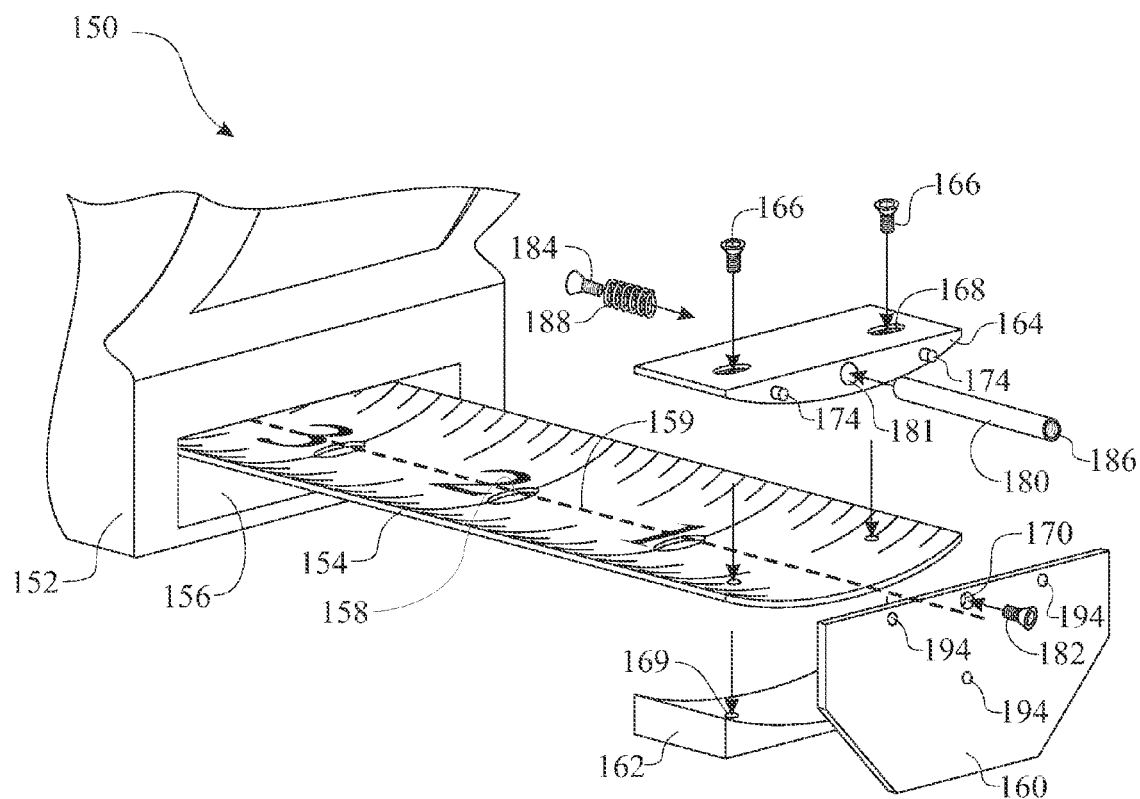
FIG. 15 is an isometric assembly diagram of the rotating catch tape measure previously presented in FIG. 14.
Figure 16:
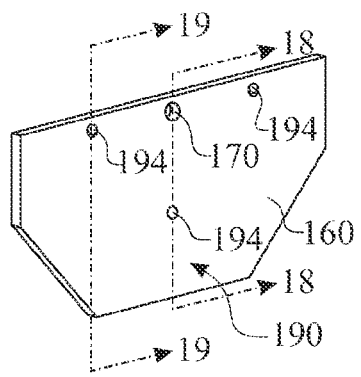
FIG. 16 is an isometric anterior view of the catch provided in the rotating catch tape measure previously presented in FIG. 14
Figure 17:
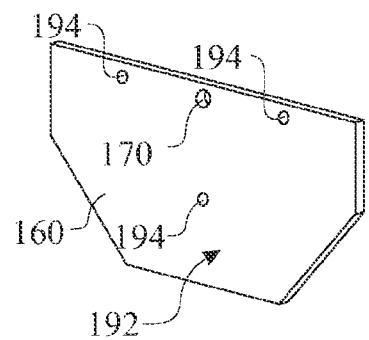
FIG. 17 is an isometric posterior view of the catch previously presented in FIG. 16.
Figure 18:
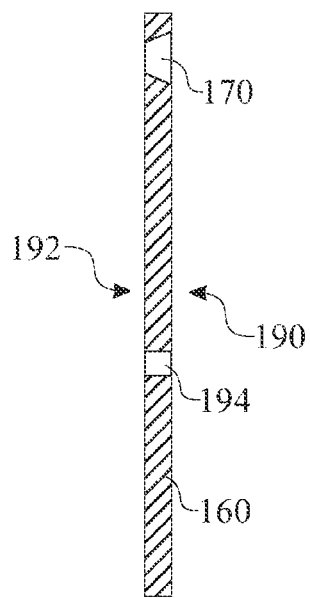
FIG. 18 is a sectional view of the catch defined as section 18-18 of FIG. 16.
Figure 19:
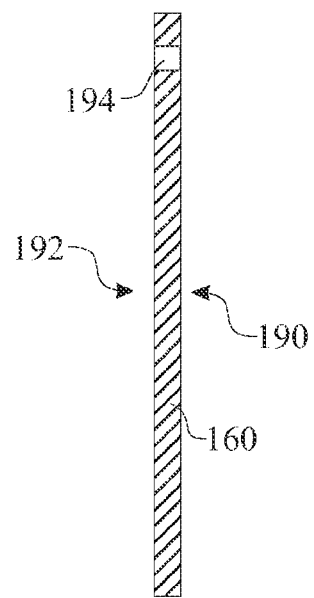
FIG. 19 is a sectional view of the catch defined as section 19-19 of FIG. 16.
Figure 20:
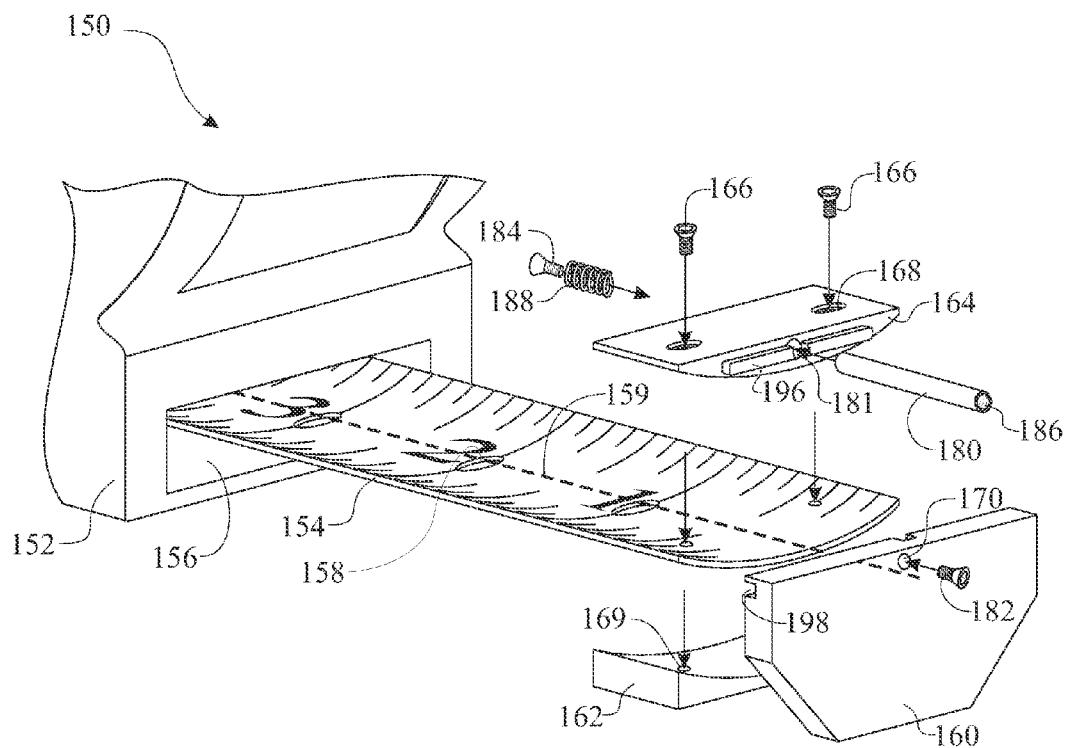
FIG. 20 is an isometric assembly diagram of a rotating catch tape measure in accordance with yet another exemplary embodiment of the present invention, presenting another alternate registration configuration using a tab and slots, allowing the catch to rotate in 90 degree increments.
Figure 21:
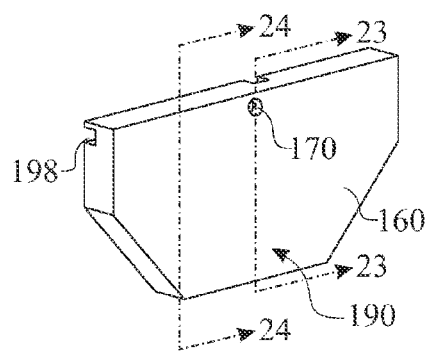
FIG. 21 is an isometric anterior view of the catch provided in the rotating catch tape measure previously presented in FIG. 20.
Figure 22:
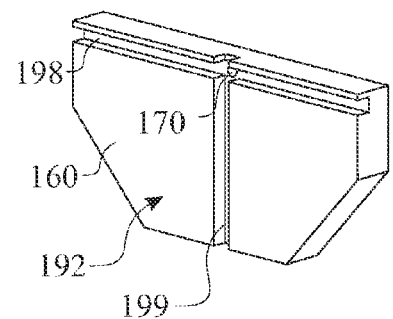
FIG. 22 is an isometric posterior view of the catch previously presented in FIG. 21.
Figure 23:
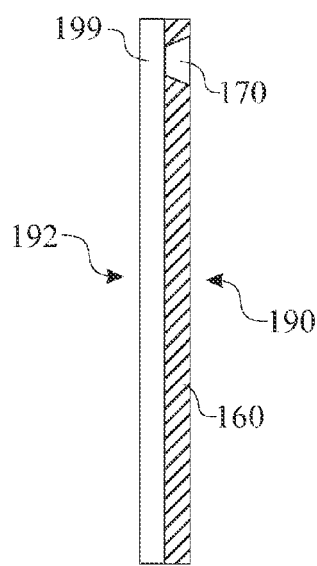
FIG. 23 is a sectional view of the catch defined as section 23-23 of FIG. 21.
Figure 24:
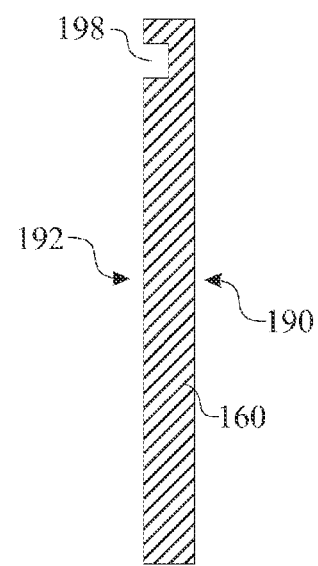
FIG. 24 is a sectional view of the catch defined as section 24-24 of FIG. 21.

In the second pin configuration, the pins 174 are aligned with the catch pivot 170 as shown in FIGS. 10 through 13. When the user rotates the catch 160 to project upwards via a catch rotation 172, the pins 174 are dislodged from the aligned locking apertures 177 and subsequently reinserted into the same aligned locking apertures 177 (FIG. 9).

The user pulls the rotating catch 160 outward, providing a distance between the rotating catch 160 and the upper coupling member 164 thus retracting the pin 174 from the aperture 176, 178. Once the pins 174 are retracted from the aperture, the rotating catch 160 is free to rotate about the pivot assembly. The user rotates the rotating catch 160 about the pivot assembly, aligning the pins 174 with the respective apertures 176, 177, 178. The registration assist spring 188 aids in returning seating the pins 174 into the apertures 176, 177, 178.

In yet another embodiment, the pins 174 are affixed to the rotational catch coupling assembly, and apertures 194 are provided within the rotating catch 160. This provides the user with a unique adaptation, wherein the rotating catch 160 can project upwardly, downwardly, and to either side of the measuring tape 154, as presented via the exemplary embodiment illustrated in FIGS. 14 through 19. The rotating catch 160 can have a width equal to, smaller than, or wider than a width of the measuring tape 154. The rotating catch 160 can include additional apertures 194, providing the user with additional angles for use.

Alternatively to the pin-aperture configuration, the registration interface can utilize a tab-slot configuration. The tab-slot configuration is best presented in FIGS. 20 through 24. The exemplary embodiment utilizes a majority of the features previously presented, but incorporates a registration tab 196 on the rotational catch coupling assembly, and a lateral registration slot 198 on the catch posterior contacting surface 192 of the rotating catch 160. A longitudinal registration slot 199 can be included on the catch posterior contacting surface 192 of the rotating catch 160, providing for 90-degree rotational increments. It is understood that additional slots can be included for additional rotational increments.

The measuring tape 154 further comprising a plurality of uniformly positioned tape apertures 158. The tape apertures 158 are similar to tape apertures 120 previously presented.

Figure 25:
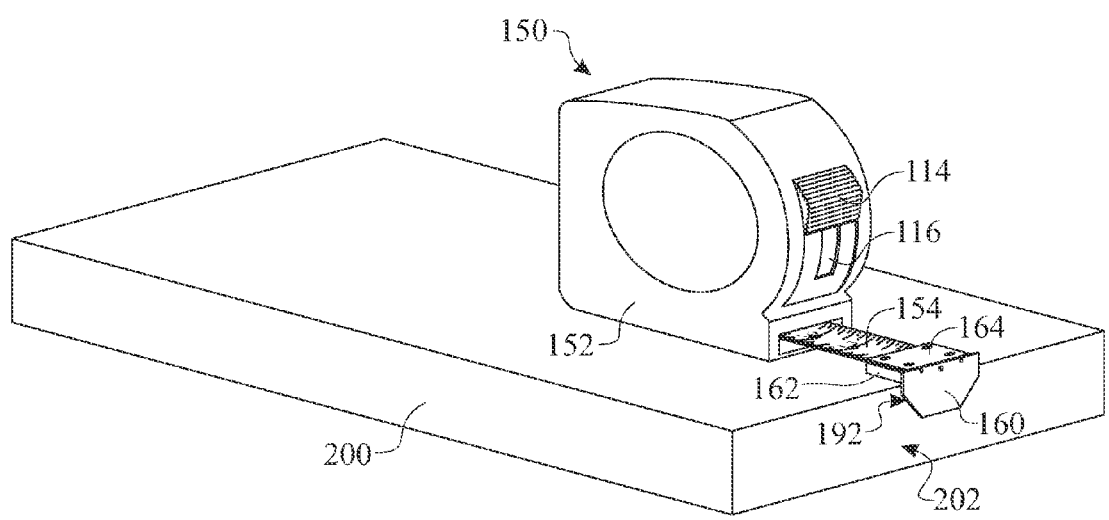
FIG. 25 is an isometric view of the rotating catch tape measure shown in use in accordance with a catch down orientation.
Figure 26:
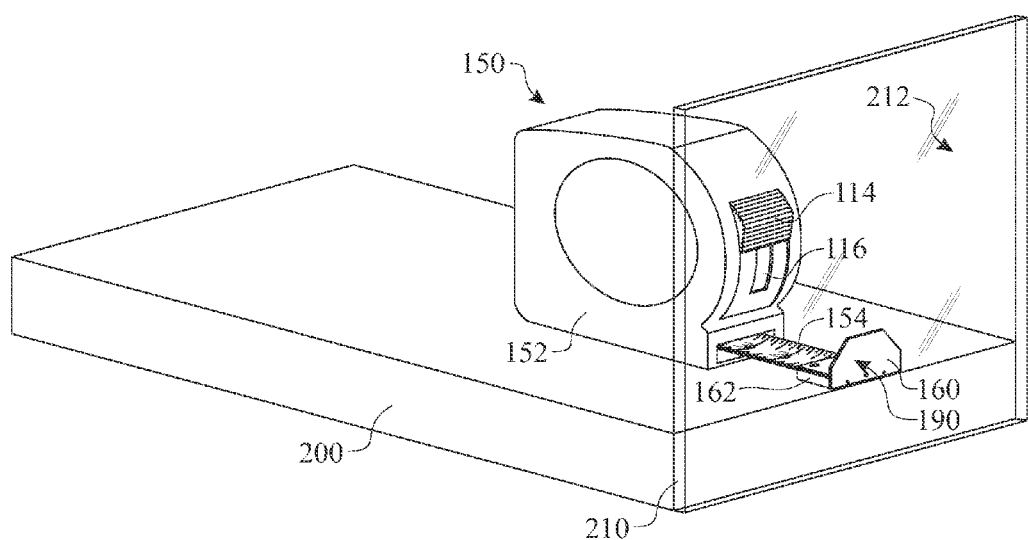
FIG. 26 is an isometric view of the rotating catch tape measure shown in use in accordance with a catch up orientation.

The present invention provides the user with a catch 160 that can be used in a variety of applications, two being presented in FIGS. 25 and 26. The first (FIG. 25) is for measuring a measured object 200. The catch 160 is oriented projecting downward and placed with the catch posterior contacting surface 192, contacting an exterior surface 202 of the measured object 200. The lower coupling member 162 is of a thickness (height) wherein the measuring tape 154 remains parallel with the surface of the measured object 200. The second (FIG. 26) is measuring a measured object 200 having an interfering member 210 assembled to at least one end. The interfering member 210 is presented as being transparent merely for clarity. The catch 160 is oriented projecting upward and placed with the catch anterior contacting surface 190, contacting an interior surface 212 of the interfering member 210. The tape lock 114 is slid downward along the tape lock slot 116 to lock the measuring tape 154, preventing it from retracting into the tape measure housing 152.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A measuring tape apparatus, comprising:
   a tape measure housing having a tape opening;
   a retractable measuring tape contained within the housing, a distal end of the tape maintained extending from the interior of the housing, through the opening, to the exterior of the housing; and
   a catch pivotally coupled to the distal end of the measuring tape such that the catch is rotatable about a measuring tape longitudinal axis,
   wherein the catch pivots about a pivot assembly, the pivot assembly comprising a shaft that is slidably assembled to a rotational catch coupling assembly disposed upon the distal end of the measuring tape.

2. A measuring tape apparatus as recited in claim 1, the pivotable catch further comprising a pivot registration interface.

3. A measuring tape apparatus as recited in claim 2, wherein the pivot registration interface enables 90-degree incremental rotational registration of the catch about the longitudinal axis of the tape.

4. A measuring tape apparatus as recited in claim 1, the pivotal catch further comprising a pivot registration interface, the pivot registration interface comprising at least of:
   a. at least one pin and respective aperture, and
   b. at least one tab and respective slot.

5. A measuring tape apparatus as recited in claim 1, the pivot assembly further comprising a registration assisting spring disposed about the shaft.

6. A measuring tape apparatus as recited in claim 1, the pivotal catch further comprising a pivot registration interface, the pivot registration interface comprising at least of:
   a. at least one pin and respective aperture, and
   b. at least one tab and respective slot.

7. A measuring tape apparatus as recited in claim 1, the measuring tape further comprising a plurality of tape apertures.

8. A measuring tape apparatus, comprising:
   a tape measure housing having a retractable measuring tape contained therein, a distal end of the tape maintained extending from the interior of the housing, through a housing opening, to the exterior of the housing;
   a rotational catch coupling assembly mounted to the distal end of the measuring tape; and
   a catch pivotally coupled to the rotational catch coupling assembly, the catch rotatable about a measuring tape longitudinal axis,
   wherein the catch pivots about a pivot assembly, the pivot assembly comprising a shaft that is slidably assembled to the rotational catch coupling assembly.

9. A measuring tape apparatus as recited in claim 8, the pivot assembly further comprising a registration assisting spring disposed about the shaft.

10. A measuring tape apparatus as recited in claim 9, the pivotal catch further comprising a pivot registration interface, the pivot registration interface comprising at least of:
   a. at least one pin and respective aperture, and
   b. at least one tab and respective slot.

11. A measuring tape apparatus as recited in claim 8, the pivot assembly further comprising a registration assisting spring disposed about the shaft.

12. A measuring tape apparatus as recited in claim 8, the pivotal catch further comprising a pivot registration interface, the pivot registration interface comprising at least of:
   a. at least one pin and respective aperture, and
   b. at least one tab and respective slot.

13. A measuring tape apparatus as recited in claim 8, the measuring tape further comprising a plurality of tape apertures.

14. A measuring tape apparatus, comprising:
   a tape measure housing having a retractable measuring tape contained therein, a distal end of the tape maintained extending from the interior of the housing, through a housing opening, to the exterior of the housing;
   a rotational catch coupling assembly disposed upon the distal end of the measuring tape;
   a catch pivotally coupled to the rotational catch coupling assembly, rotating about a measuring tape longitudinal axis; and
   a pivot registration interface wherein the pivot registration interface provides a 90-degree incremental rotational registration of the catch about the tape longitudinal axis,
   wherein the catch pivots about a pivot assembly, the pivot assembly further comprising a shaft that is slidably assembled to the rotational catch coupling assembly.

15. A measuring tape apparatus as recited in claim 14, the pivotal catch further comprising a pivot registration interface, the pivot registration interface comprising at least of:
   a. at least one pin and respective aperture, and
   b. at least one tab and respective slot.

16. A measuring tape apparatus as recited in claim 14, the pivot assembly further comprising a registration assisting spring disposed about the shaft.

17. A measuring tape apparatus as recited in claim 16, the pivotal catch further comprising a pivot registration interface, the pivot registration interface comprising at least of:
   a. at least one pin and respective aperture, and
   b. at least one tab and respective slot.

18. A measuring tape apparatus as recited in claim 14, the measuring tape further comprising a plurality of tape apertures.

* * * * *